Sept. 14, 1948. C. F. BEAM 2,449,525
AUTOMOBILE SANDING DEVICE
Filed June 18, 1947
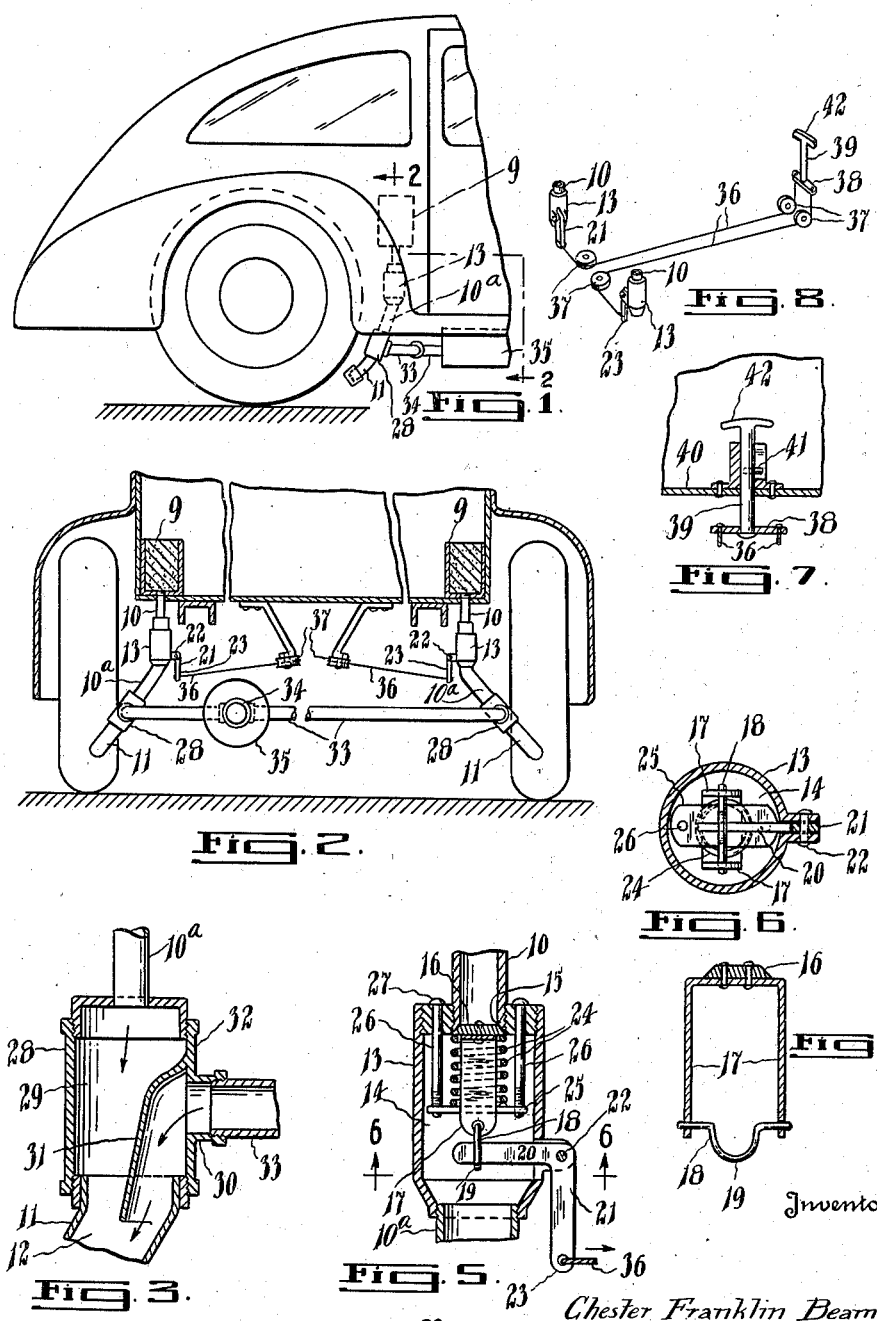
Inventor
Chester Franklin Beam
By Frederick C. Bromley
Attorney Patented Sept. 14, 1948

2,449,525

UNITED STATES PATENT OFFICE 2,449,525

AUTOMOBILE SANDING DEVICE

Chester F. Beam, Niagara Falls, Ontario, Canada

Application June 18, 1947, Serial No. 755,398

1 Claim. (Cl. 291—25)

My invention relates to devices for distributing sand to the traction wheels of an automobile in order to preclude skidding and slipping on icy pavements and to enhance traction as is found necessary according to weather and road conditions.

It is highly desirable to equip an automobile with a sand spreader and such a device should be so organized that it is ready for instant use at all times. The sand must be kept in a dry and free flowing condition in order that the apparatus may function efficiently especially during cold and rainy weather when demands are made on it.

Hence it is a primary object of my invention to provide an automobile sanding device of a reliable and serviceable character which is easy to operate, and which assures that the sand will be kept in a dry condition at all times irrespective of prevailing weather conditions.

A further object of my invention is to provide in a sanding device an improved valve mechanism for discharge of sand, which by virtue of its construction obviates any tendency for the material to become clogged in the passages or otherwise.

A still further object is to provide a structure by which exhaust gases are utilized as an effective heating medium for the sand whereby it is kept dry and assisted in discharge by the spent gases of combustion.

A distinctive feature of construction resides in the provision of a manual control for the discharge of sand which is so devised that it can be readily manipulated by the driver preferably by hand movement.

The instant invention is adapted to be installed on a standard motor vehicle as an accessory or original equipment. It is inexpensive to manufacture and presents an important improvement in the art.

The invention will be clearly understood by reference to the ensuing detailed description of a selected construction which is illustrated in the accompanying drawing. It is not my intention to restrict my invention to the exact disclosure contained in said drawing as it will be apparent that such changes and modifications may be resorted to as come within the scope of the subjoined claim.

In the drawing, Fig. 1 is a fragmentary side view of the rear part of a motor vehicle showing the application of my invention thereto for distributing sand to the front of the traction wheels.

Fig. 2 is a cross sectional aspect of Fig. 1 taken substantially along the line 2—2 thereof.

Fig. 3 is a vertical section of the lower end of one of the discharge ducts showing the exhaust connection and the nozzle.

Fig. 4 is a side view in section of a valve body belonging to the control valve of one of the discharge ducts.

Fig. 5 is a vertical section of the control valve for the discharge ducts.

Fig. 6 is a cross section on line 6—6 of Fig. 5.

Fig. 7 is a vertical sectional view detailing the mounting of the operating handle of the valve control mechanism.

Fig. 8 is a perspective aspect detailing the valve control mechanism.

In carrying out my invention I provide an individual sand box and discharge duct for each traction wheel of the vehicle. The sand boxes, indicated at 9, are of a suitable shape and construction, and each is desirably located in the vicinity of a traction wheel and forwardly thereof. The sand boxes are of a capacity for holding an adequate supply of material and are shown as supported within the body of the automobile. Preferably they will be disposed at convenient but inconspicuous locations where access may be had to them for filling purposes. A suitable location may be adopted either within or externally of the vehicular body according to the dictates of the manufacturer. An approved closure may be used, this and other minor details being left to the discretion of the maker.

Each sand box is supplied with a discharge duct, generally denoted at 10, extending downwardly and outwardly from its bottom for conducting sand to the adjacent traction wheel of the vehicle. The said discharge ducts are of identical construction and each includes an intermediate section 10a and a lower end section in the form of a nozzle 11 inclined toward the adjacent traction wheel and having a downturned egress 12 for directing and spreading sand in front of the traction wheel.

Interposed in each of the discharge ducts 10 is a valve 13 comprising a body member forming a chamber 14 providing a vertically arranged through passage for material. The upper end of the chamber 14 is supplied with a seat 15 normally engaged by a valve proper 16. The faces of the seat and the valve proper are shown as of the beveled type. The valve proper is formed with a pair of spaced depending arms 17 on the lower ends of which is pivotally attached a saddle bar 18 having an offset or looped intermediate part 19. The part 19 of said saddle bar is engaged by an arm 20 of a bellcrank 21 pivoted on the valve body as at 22 with its companion arm 23 downwardly disposed for swinging outwardly under the influence of the control mechanism hereinafter described in detail.

The valve proper is biased toward the seat 15 by a compression spring 24 of the coil type disposed between the arms 17 and supported by a cross plate 25 also arranged between said arms and carried by bolts 26. Said bolts are arranged parallelly to said spring with their headed ends inserted through openings in said body member and with their heads 27 accessible. The shanks of the bolts have screw-threaded engagement with said cross plate 25. Accordingly the tension of said springs can be adjusted by turning the bolts 26. A pull exerted on the arm 23 of the bellcrank is operative to open the valve for gravitational discharge of sand.

Also interposed in each of the discharge ducts 10 between the section 10a and nozzle 11 thereof is a junction box 28 having a through passage 29 provided with a lateral inlet 30 for exhaust gases. Said junction box is located below the valve 13 and is supplied with an internal dividing wall 31 in the form of a deflector extended downwardly from the wall portion 32 adjacent to said inlet 30 in order to deflect introduced exhaust gases toward the spout or nozzle 11. By this arrangement the down flow of sand in the opening of said valve 13 cannot obstruct the inlet 30 for exhaust gases, but on the other hand the entrained exhaust gases promote forceful discharge of the sand and the derived heat effectively keeps the discharge duct and the stored material in a dry state.

The said inlet 30 of each junction box is connected by a branch pipe 33 to the regular exhaust pipe 34 rearwardly of the muffler 35. In this way exhaust gases are diverted to the discharge ducts 10.

The control mechanism for operation of the valves 13 comprises an arrangement of flexible elements 36 trained over pulleys 37 and connected at one end to the arms 23 of said bellcranks for exerting an opening force on the valves proper 16. The other end of said flexible elements is connected by a member 38 to a pull rod 39 slidably extended through the floor-board 40 of the vehicle in the vicinity of the driver's seat. Said pull rod is keyed as at 41 against turning movement and supplied with a hand grip 42.

From the preceding description it will be manifest that all the operator of the vehicle has to do in order to spread sand in front of each traction wheel is to pull on the handle 42 of the control mechanism, which opens the valves in unison to effect a discharge of the material from the source of supply.

The advantages and utility of the novel instrumentalities of the invention will be appreciated by those familiar with the art, and it is not intended to limit the invention to the specific arrangement herein described inasmuch as such changes may be made as come within the scope of the appended claim.

What I claim is:

In an automobile sanding device having a duct for gravity flow of sand from a source of supply, a control valve therein comprising a body member interposed in said discharge duct providing a vertical chamber defined in part by a top wall centrally apertured to form an inlet, said top wall having an outer face and an inner face, said inner face providing a valve seat surrounding the central aperture in said top wall, a valve in said chamber having a top face normally engaging said seat and having a pair of spaced depending arms, a cross plate disposed between said arms to extend transversely thereof, a compression coil spring disposed between said arms with its upper end engaged with said valve and its lower end seated on said cross plate, bolts extending through openings provided in said top wall at opposite sides of said central aperture, said bolts having heads engaged with said outer face of said top wall and being threadedly engaged with said cross plate for adjusting the tension of said spring, a saddle bar pivotally mounted on said arms below said cross plate, and a bellcrank pivoted on said body member having an arm engaged with said saddle bar for opening said valve.

CHESTER F. BEAM.

REFERENCES CITED

The following references are of record in the file of this patent:

UNITED STATES PATENTS

| Number | Name | Date |
| --- | --- | --- |
| 931,444 | Longmire | Aug. 17, 1909 |
| 1,421,745 | Taylor | July 4, 1922 |
| 2,154,340 | Legoff et al. | Apr. 11, 1939 |